(12) United States Patent
Koyama

(10) Patent No.: US 12,090,593 B2
(45) Date of Patent: Sep. 17, 2024

(54) CONTROL DEVICE

(71) Applicant: Fanuc Corporation, Yamanashi (JP)

(72) Inventor: Takayuki Koyama, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 18/027,464

(22) PCT Filed: Oct. 1, 2021

(86) PCT No.: PCT/JP2021/036470
§ 371 (c)(1),
(2) Date: Mar. 21, 2023

(87) PCT Pub. No.: WO2022/075223
PCT Pub. Date: Apr. 14, 2022

(65) Prior Publication Data
US 2023/0364728 A1   Nov. 16, 2023

(30) Foreign Application Priority Data

Oct. 5, 2020   (JP) ................................ 2020-168677

(51) Int. Cl.
*B23Q 15/26*   (2006.01)
(52) U.S. Cl.
CPC .................................... *B23Q 15/26* (2013.01)
(58) Field of Classification Search
CPC .................................................... B23Q 15/26
See application file for complete search history.

(56) References Cited

U.S. PATENT DOCUMENTS

2002/0138171 A1   9/2002   Fukutani
2014/0005823 A1*  1/2014   Otsuki ............... G05B 19/4103
                                              700/189

(Continued)

FOREIGN PATENT DOCUMENTS

JP    0542452 A    2/1993
JP    08249028 A   9/1996

(Continued)

OTHER PUBLICATIONS

Machine translation of WO 2018011990 A1, Yasukochi et al., Jan. 18, 2018 (Year: 2018).*

(Continued)

*Primary Examiner* — Vinh Luong
(74) *Attorney, Agent, or Firm* — Buchanan Ingersoll & Rooney PC

(57) ABSTRACT

A control device generates, for each command cycle on the basis of machining line information expressing a plane machining line with a function displayed by a prescribed parameter and tangential line information showing a tangential line direction at respective positions of the machining line, a position command on a rotational axis and two linear axes with a position on the machining line obtained when the parameter is changed by a prescribed amount set as a machining position. The position command generated by the control device includes a command on a position of the rotational axis at which the tangential line at the machining position forms a prescribed angle set in advance with respect to any one of the linear axes and a command on the position of the two linear axes at which a tool is set at the machining position when the rotational axis is located at the position of the rotational axis.

3 Claims, 8 Drawing Sheets

(56) References Cited

U.S. PATENT DOCUMENTS

| | | | |
|---|---|---|---|
| 2015/0293522 A1 | 10/2015 | Masumiya et al. | |
| 2018/0200802 A1 | 7/2018 | Kanada et al. | |
| 2019/0310602 A1* | 10/2019 | Yamamoto | G05B 19/186 |
| 2021/0001483 A1* | 1/2021 | Milenkovic | B25J 9/1666 |
| 2021/0294295 A1* | 9/2021 | Yokota | G05B 19/402 |

FOREIGN PATENT DOCUMENTS

| | | | | |
|---|---|---|---|---|
| JP | 4823471 B2 | 11/2011 | | |
| WO | WO 02067068 A1 * | 8/2002 | | G05B 19/4155 |
| WO | 2014068675 A1 | 5/2014 | | |
| WO | WO 2016009502 A1 * | 1/2016 | | G05B 19/404 |
| WO | 2017043171 A1 | 3/2017 | | |
| WO | WO 2018011990 A1 * | 1/2018 | | B23Q 15/00 |

OTHER PUBLICATIONS

Translation of Written Opinion of the International Searching Authority of PCT/JP2021/036470, Dec. 14, 2021 (Year: 2021).*
Translation of WO 2016009502 A1, Asano, Jan. 21, 2016 (Year: 2016).*
International Search Report and Written Opinion for International Application No. PCT/JP2021/036470, dated Dec. 14, 2021, 6 pages.

* cited by examiner

CONTROL DEVICE

CROSS REFERENCE TO RELATED APPLICATIONS

This is the U.S. National Phase application of PCT/JP2021/036470, filed Oct. 1, 2021, which claims priority to Japanese Patent Application No. 2020-168677, filed Oct. 5, 2020, the disclosures of each of these applications being incorporated herein by reference in their entireties for all purposes.

FIELD OF THE INVENTION

The present invention relates to a control device and, in particular, to a control device that enables cutting point fixation control in machining a freely-selected shape to be machined.

BACKGROUND OF THE INVENTION

A machine with one rotational axis C and one linear axis X can machine various curves by controlling the X-axis according to the angle of the C-axis while rotating the C-axis. For example, when the incomplete round shape of a cam or the like or the eccentric shape of a crank pin or the like is machined, the X-axis position of a turret tool rest with respect to a rotational angle of a main shaft is specified and the rotation of the main shaft and the X-axis movement of the turret tool rest are synchronously controlled to actualize the machining of an incomplete circular round surface or an eccentric surface.

However, the above configuration gives rise to a problem that the contact point of a tool with respect to a workpiece is not fixed except for a complete circle in which the center matches the rotation center of the C-axis. In a case in which a workpiece 81 is eccentrically placed on a table 80 that rotates with the rotation center of the C-axis as an axis as shown in, for example, FIGS. 6A to 6C, the blade of a tool 82 substantially perpendicularly contacts the workpiece 81 when machining is performed at the rotational position shown in FIG. 6A, the upper side of the blade of the tool 82 contacts the workpiece 81 when machining is performed at the rotational position shown in FIG. 6B, and the lower side of the blade of the tool 82 contacts the workpiece 81 when machining is performed at the rotational position shown in FIG. 6C. Therefore, there arise problems such as the occurrence of unevenness in the finish of a machined surface depending on a machining spot and the occurrence of a fluctuation in machining accuracy depending on a machining spot as the tool 82 is worn.

In view of this, in Patent Literature 1, the fixed direction of a tool with respect to a workpiece is actualized with a rotational axis Ct used to control the direction of the tool and a linear axis Y orthogonal to an X-axis. Furthermore, Patent Literature 2 teaches a control method called cutting point fixation control with a linear axis Y orthogonal to a X-axis. The cutting point fixation control is a control method for maintaining the direction of a cutting point as seen from the center of a tool in a fixed direction at all times in a coordinate system showing the position of a machine on two orthogonal linear axes.

PATENT LITERATURE

[Patent Literature 1] Japanese Patent Laid-open Publication No. H05-42452

[Patent Literature 2] Japanese Patent Laid-open Publication No. H08-249028

SUMMARY OF THE INVENTION

However, in the above Patent Literatures, a structure in which a rotational axis is arranged on the side of a tool causes a problem such as an increase in the cost for development and maintenance, and a specific method for controlling the rotational axis of the tool is not taught. Furthermore, although a specific control method for machining a straight line, an arc, and an involute is taught as for general cutting point fixation control, no method for machining other machining shapes such as an elliptic shape or a shape eccentric from the rotation center of a C-axis is taught.

Therefore, a method enabling cutting point fixation control with a simple structure during the machining of a freely-selected machining line has been demanded.

As illustrated in FIGS. 7 to 9, a control device according to the present invention reads, as for a machining line $p(\lambda)$ commanded by a machining program, information displayed by a parameter $\lambda$ and tangential direction information from a storage. Next, the control device calculates a point $P_\lambda$ on the machining line in a case in which the parameter $\lambda$ is changed from the start point to the end point of the machining line $p(\lambda)$, and calculates the angle of a rotational axis C at which a tangential line direction is fixed on the basis of tangential line information at the calculated point $P_\lambda$. Then, the control device calculates the positions of two linear axes from the angle of the rotational axis C and the command point $P_\lambda$ thus calculated, and notifies a servo motor of calculated values to actualize cutting point fixation control on the machining line.

Furthermore, an aspect of the present invention provides a control device for controlling a machine with at least one rotational axis and two linear axes configured to relatively move a tool and a workpiece on a basis of a machining program to perform machining, the control device including: a machining line data storage that stores machining line information expressing a plane machining line with a function displayed by a prescribed parameter and tangential line information showing tangential line directions at respective positions of the machining line; and a cutting point fixation command generator that generates, for each command cycle on a basis of the machining line information and the tangential line information, position commands of the rotational axis and the two linear axes with a position on the machining line obtained when the parameter is changed by a prescribed amount set as a machining position, wherein the position commands generated by the cutting point fixation command generator include a command of a position of the rotational axis at which a tangential line at the machining position forms a prescribed angle set in advance with respect to any of the linear axes and a command of positions of the two linear axes at which a tool is set at the machining position when the rotational axis is located at the position of the rotational axis.

According to an aspect of the present invention, it is possible to easily command control to fix an angle at which a tool contacts a workpiece during the machining of a freely-selected machining line with one rotational axis and two linear axes.

DETAILED DESCRIPTION OF EMBODIMENTS OF THE INVENTION

Hereinafter, embodiments of the present invention will be described together with the drawings.

Figure 1:
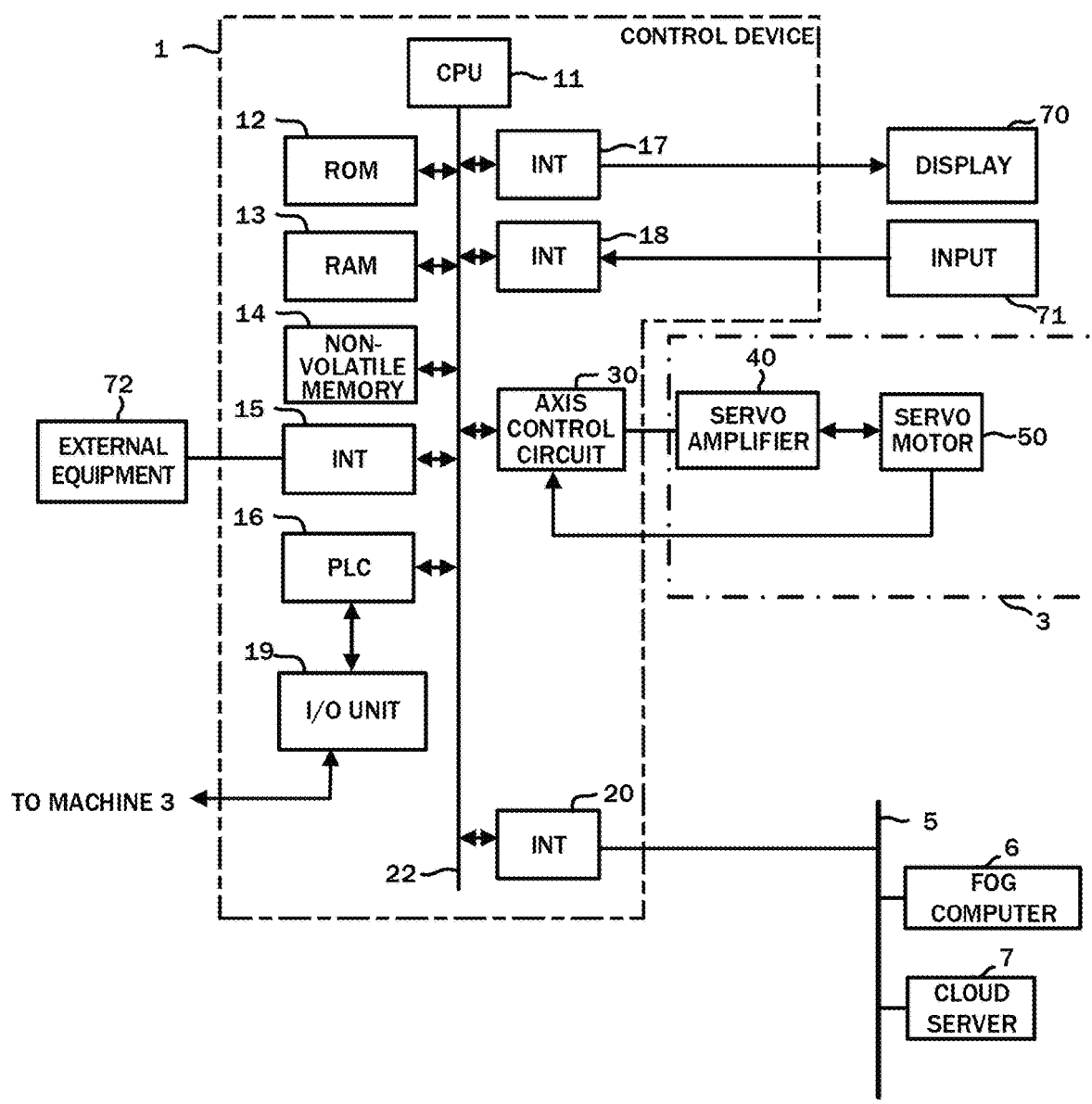
FIG. 1 is a schematic hardware configuration diagram of a control device according to a first embodiment.

FIG. 1 is a schematic hardware configuration diagram showing essential parts of a tool diagnosis device according to a first embodiment of the present invention. A control device 1 according to the present invention can be mounted as, for example, a control device for controlling a machine 3 configured to perform machining on the basis of a machining program.

A CPU 11 included in the control device 1 according to the present embodiment is a processor configured to entirely control the control device 1. The CPU 11 reads system program stored in a ROM 12 via a bus 22 and then controls the entire control device 1 according to the system program. In a RAM 13, temporary calculation data or display data and various data or the like which are input from the exterior are temporarily stored.

For example, a non-volatile memory 14 is constituted by a memory, an SSD (Solid State Drive), or the like which is backed up by a battery not shown. Thereby, its storage state is maintained even when the power supply of the control device 1 is turned off. In the non-volatile memory 14, a machining program and data read from external equipment 72 via an interface 15, a machining program and data which are input via an input device 71, a machining program or data acquired from other devices via a network 5, and the like are stored. The machining program and data stored in the non-volatile memory 14 may be developed into the RAM 13 when they are executed or used. Further, various system programs such as known analysis programs are written in advance in the ROM 12.

An interface 15 is an interface used to connect the CPU 11 in the control device 1 and the external equipment 72 such as a USB device to each other. From the external equipment 72, a machining program, setting data, and so on used to control the machine 3 or the like are read. Furthermore, a machining program, setting data, or the like edited inside the control device 1 can be stored via the external equipment 72 in external storage means. A PLC (Programmable Logic Controller) 16 performs a ladder program to output a signal via an I/O unit 19 to the machine 3 and peripheral devices of the machine 3 (for example, a tool replacement device, an actuator such as a robot, and a sensor such as a temperature sensor and a humidity sensor attached to the machine 3) to control the machine 3 and the peripheral devices. Furthermore, the PLC 16 receives signals from various switches in an operating panel arranged in the body of the machine 3, peripheral devices, or the like, applies required signal processing to the signals, and then transmits the processed signals to the CPU 11.

An interface 20 is an interface used to connect the CPU in the control device 1 and a wired or wireless network 5 to each other. Other machines, a fog computer 6, a cloud server 7, and the like are connected to the network 5 and exchange data with the control device 1.

On a display device 70, respective data read on a memory, data obtained when a program or the like is performed, and so on are output and displayed via an interface 17. Furthermore, an input device 71 constituted by a keyboard, a pointing device, and so on gives a command based on operation by an operator, data, and so on via the interface 18 to the CPU 11.

An axis control circuit 30 used to control axes in the machine 3 receives an axis movement command amount from the CPU 11 and outputs an axis command to a servo amplifier 40. In receiving the command, the servo amplifier 40 drives a servo motor 50 for moving a driving unit included in the machine 3 along the axis. The servo motor 50 for the axis includes a position/speed detector and feeds back a position/speed feedback signal from the position/speed detector to the axis control circuit 30 to perform the feedback control of a position/speed. Note that the axis control circuit 30, the servo amplifier 40, and the servo motor 50 are singly shown in the hardware configuration diagram of FIG. 1 but are actually provided by the number of axes in the machine 3 to be controlled. For example, the machine 3 controlled by the control device 1 according to the present embodiment includes two linear axes (X and Y axes) and one rotational axis. By controlling these axes, the control device 1 relatively moves a workpiece and a tool. Therefore, three sets of the axis control circuits 30, the servo amplifiers 40, and the servo motors 50 are provided.

Figure 2:
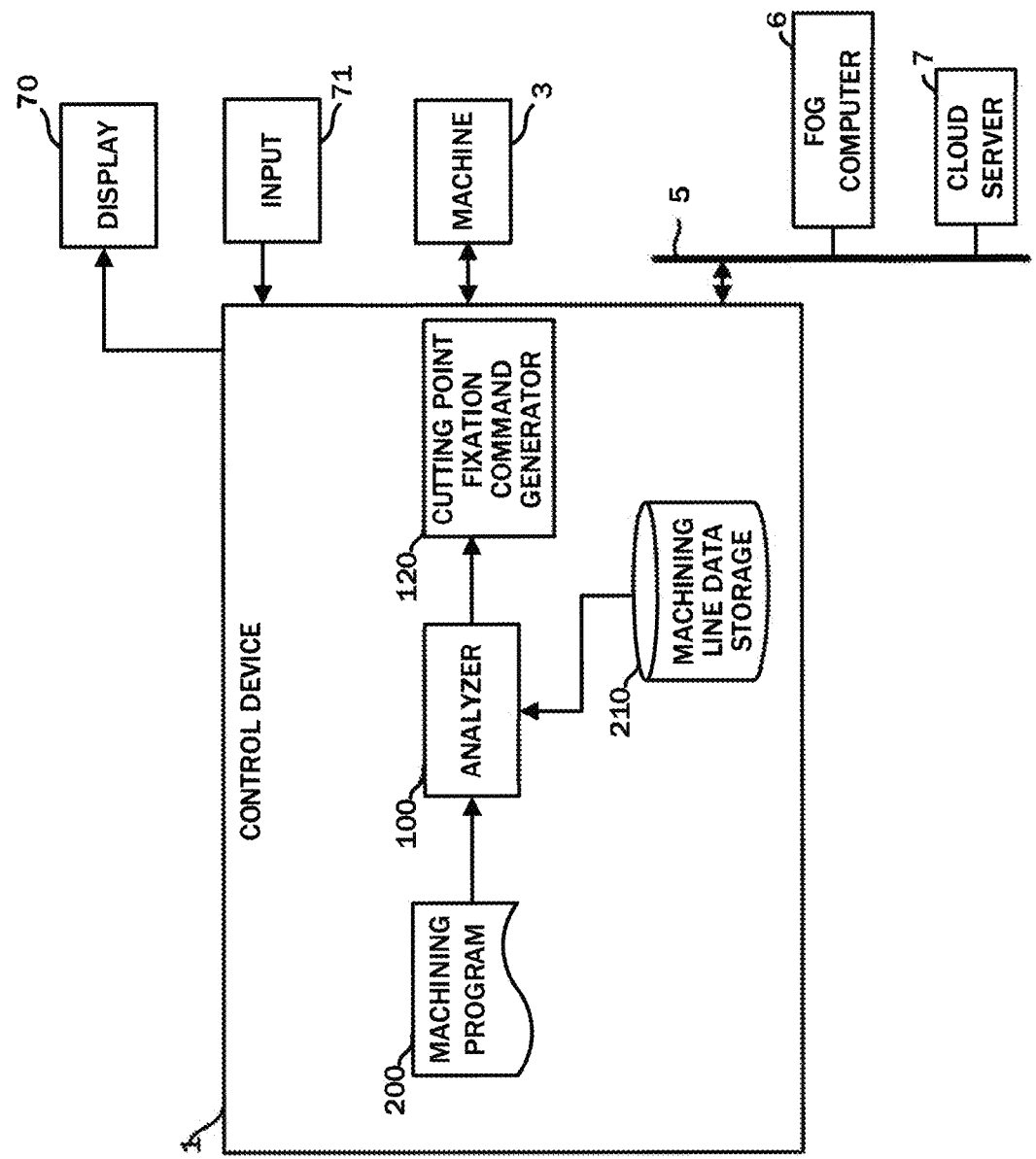
FIG. 2 is a schematic block diagram showing the functions of the control device according to the first embodiment.

FIG. 2 shows a schematic block diagram of functions provided in the control device 1 according to the first embodiment of the present invention. The respective functions included in the control device 1 according to the present embodiment are actualized when the CPU 11 in the control device 1 shown in FIG. 1 performs the system program and controls the operation of the respective units in the control device 1.

The control device 1 of the present embodiment includes an analyzer 100 and a cutting point fixation command generator 120. Further, in the RAM 13 and the non-volatile memory 14 in the control device 1, a machining line data storage 210 for storing a machining program 200 used to control the machine 3 and serving as a region to store machining line information displayed by one parameter In a plane and the tangential line information of the machining line is provided.

The analyzer 100 is actualized when the CPU 11 included in the control device 1 shown in FIG. 1 runs the system program read from the ROM 12 and mainly performs computation processing using the RAM 13 and the non-volatile memory 14. The analyzer 100 analyzes the machining program 200 to generate command data used to control the machine 3 including the servo motor 50 and the peripheral devices of the machine 3. The machining program 200 can include, in addition to a command generally used in the control of the machine 3, a "cutting point fixation control start command" for commanding the start of cutting point fixation control and a "cutting point fixation control end command" for commanding the end of the cutting point fixation control.

In addition, in receiving a general command according to the machining program 200, the analyzer 100 performs a conventional command analysis to control the machine 3 on the basis of analyzed command data. On the other hand, in receiving the "cutting point fixation control start command" according to the machining program 200, the analyzer 100 reads the machining line information displayed by one parameter in the plane and the tangential line information of the machining line from the machining line data storage 210 and gives a command to start cutting point fixation control based on the read machining line information and tangential line information to the cutting point fixation command generator 120.

In the machining line data storage 210, machining line information showing a machining line expressing the machined shape of a workpiece and the tangential line information of the machining line are stored in advance. In a case in which a plane obtained when a table surface on which a workpiece is placed is seen from the axial line direction of the C-axis is taken into consideration, the machining line information of the machining line C showing the machined shape can be defined as a function $r = p(\theta)$ ($\theta_0 \leq \theta \leq \theta_1$) where a rotational angle $\theta$ is used as a parameter in a polar coordinate with the central position of a graphic drawn by the machining line information as an origin. The machining line information may be generated in advance on the basis of machining-related information generated by CAD or the like and then stored in the machining line data storage 210. The tangential line information may be generated in advance on the basis of machining-related information generated by CAD or the like as with the machining line information, or may be calculated on the basis of the machining line information by the control device 1. Generally, an angle $\psi$ formed by a tangential line v at an arbitrary point $P = (r \cos \theta, r \sin \theta)$ on a machining line C ($r = p(\theta)$) and a normal line u passing through the point P with respect to a vector $O_pP$ from a polar coordinate origin $O_p$ to the point P can be calculated by following Mathematical formula 1. Note that r with a dot is one obtained by differentiating r by $\theta$ in Mathematical formula 1.

$$\psi = \arctan\frac{\dot{r}}{r} \quad \text{[Mathematical formula 1]}$$

Figure 3:
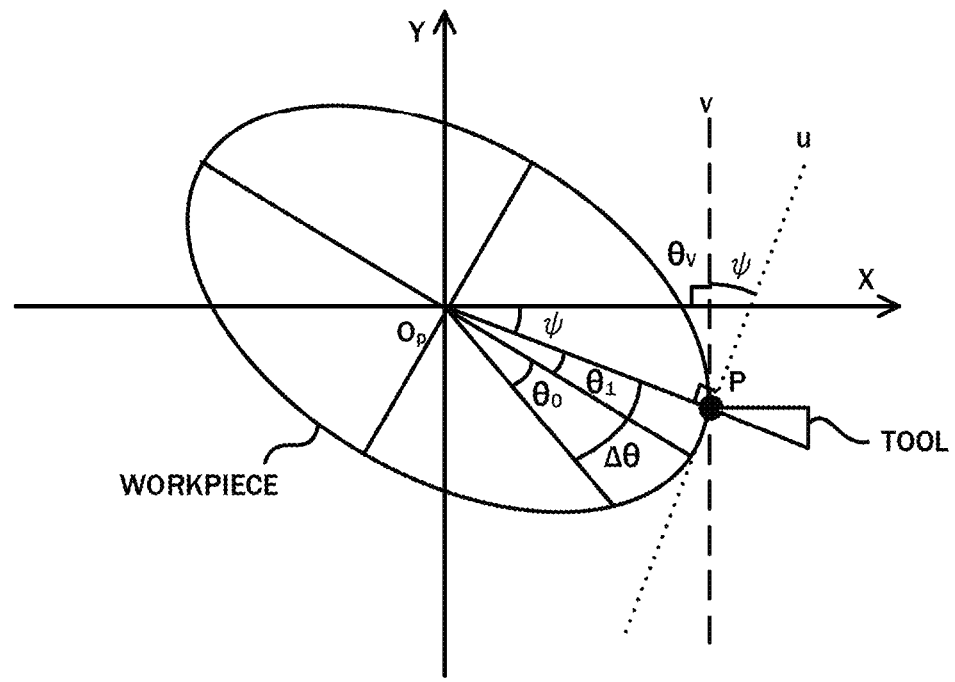
FIG. 3 is a diagram for illustrating a machining method in a case in which the polar coordinate origin of a graphic matches the rotation center of a C-axis.

For example, a case in which an elliptic curve is machined as shown in FIG. 3 will be taken into consideration. At this time, the elliptic curve can be expressed by following Mathematical formula 2 in which a rotational angle $\theta$ is used as a parameter. Therefore, the elliptic curve is stored in advance in the machining line data storage 210 as the machining line information.

$$r(\theta) = \sqrt{\frac{a^2 b^2}{a^2 \sin^2\theta + b^2 \cos^2\theta}} \quad \text{[Math. 2]}$$

Meanwhile, the tangential line information can be expressed by following Mathematical formula 3 on the basis of the function $r(\theta)$ registered as the machining line information.

$$\frac{\dot{r}}{r} = \frac{(b^2 - a^2)\cos\theta\sin\theta}{a^2\sin^2\theta + b^2\cos^2\theta} \quad \text{[Mathematical formula 3]}$$

As described above, machining line information showing a machining line to be machined and the tangential line information of the machining line are stored in advance in the machining line data storage 210, whereby cutting point fixation control can be performed using these information.

Note that it is also possible to use machining line information including a straight line. For example, a case in which machining is performed along the machining lines of a square of which the length of one side is 2 L and the polar coordinate origin of a graphic matches the rotation center of the C-axis will be taken into consideration. In this case, the machining is performed using the four machining lines. Each of four machining lines $C_0$ to $C_3$ is configured as shown in following Mathematical formula 4.

$$C_i \ldots \left(\frac{i}{2}\pi \leq \theta \leq \frac{i+1}{2}\pi\right)(i=0, 1, 2, 3) \quad \text{[Mathematical formula 4]}$$

$$\psi = \arctan\frac{\dot{r}}{r} = \theta - \left(\frac{1}{4} + \frac{i}{2}\right)\pi$$

$$r(\theta) = \frac{L}{\cos\left(\theta - \left(\frac{1}{4} + \frac{i}{2}\right)\pi\right)}$$

$$\frac{\dot{r}}{r} = \tan\left(\theta - \left(\frac{1}{4} + \frac{i}{2}\right)\pi\right)$$

Then, the machining is performed for each of the machining lines while the angle $\theta$ is changed, and the machining lines are machined one after another. In this manner, the machining of the machining lines including the straight lines can be performed.

The cutting point fixation command generator 120 is actualized when the CPU 11 included in the control device 1 shown in FIG. 1 runs the system program read from the ROM 12 and mainly performs computation processing using the RAM 13 and the non-volatile memory 14 and axis control processing using the axis control circuit 30. The cutting point fixation command generator 120 generates, for each command cycle on the basis of the machining line information and the tangential line information that are input from the analyzer 100, the position command (the angle command) of a rotational axis (C-axis) and the position command of two linear axes (X and Y axes).

The position command of the rotational axis generated by the cutting point fixation command generator 120 commands the position of the C-axis at which a tangential line at a position shown by the parameter $\theta$ in the machining line C shown by the machining line information forms a prescribed angle (for example, an angle at which a tangential line at a position on the machining line C shown by the parameter is orthogonal to the X-axis) with respect to a linear axis. Furthermore, the position command of the two linear axes generated by the cutting point fixation command generator 120 gives a command on positions shown by the parameter $\theta$ in the machining line C shown by the machining line information. The angle of the rotational axis and the positions of the two linear axes commanded by the cutting point fixation command generator 120 can be expressed by following Mathematical formula 5, for example, when it is assumed that the polar coordinate origin of a graphic drawn by the machining line information matches the rotation center of the C-axis. In Mathematical formula 5, c is the position command of the C-axis, and x and y are the position commands of X and Y axes, respectively.

$$(c,x,y)=(\psi-\theta, r, \cos \psi, r \sin \psi)$$ [Mathematical formula 5]

When cutting point fixation command control is started, the cutting point fixation command generator 120 computes the position of respective axes in a case in which the parameter θ of machining line information is changed by a change amount Δθ of the machining position for each command cycle from an angle $\theta_0$ showing the start position of a machining line to an angle $\theta_1$ showing the end position of the machining line, and commands the position to the respective axes. The change amount Δθ of the machining position for each command cycle may be determined so that a workpiece and a tool can relatively move within the range of the specifications of the tool and the machine 3 in consideration of required surface quality or a cycle time.

Figure 4:
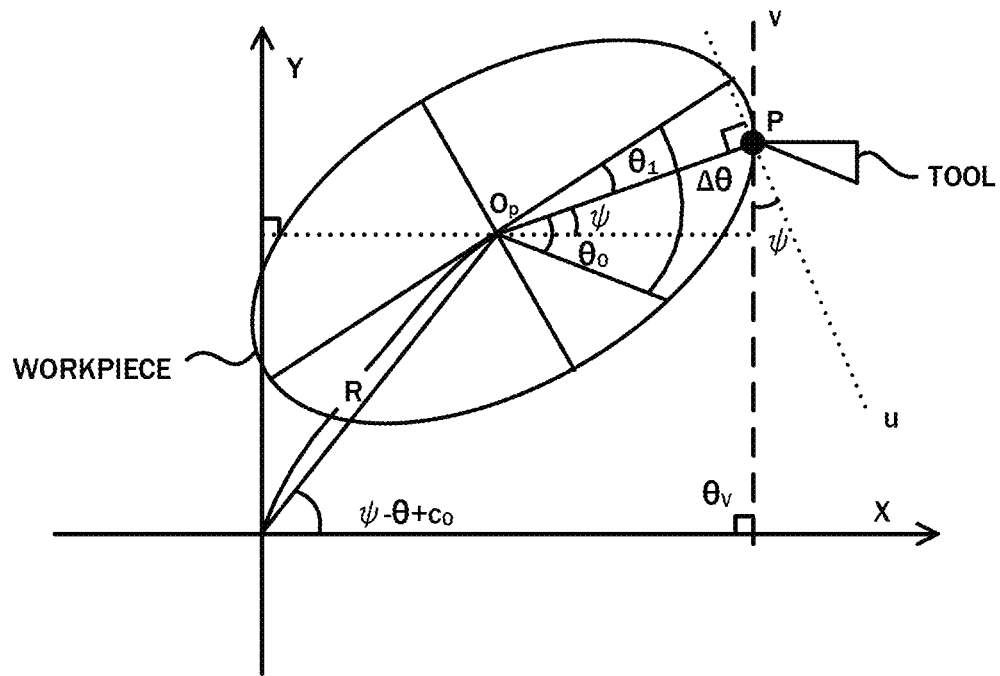
FIG. 4 is a diagram for illustrating a machining method in an eccentric case.

Note that, even where the polar coordinate origin of a graphic drawn by the machining line information does not match (is eccentric) the rotation center of the C-axis, the cutting point fixation command generator 120 can generate and command the angle of a rotational axis and the positions of two linear axes. In this case, fixation processing in the tangential line direction of the machining line and the calculation of an eccentric component may be separately performed. For example, as shown in FIG. 4, a case in which the polar coordinate origin of the graphic drawn by machining line information is shifted by a distance R and an angle ψ from the rotation center of the C-axis will be taken into consideration. At this time, it is assumed that a machining line C expressed by r=p(θ) ($\theta_0 \leq \theta \leq \theta_1$) in the polar coordinate system of the graphic is given as the machining line information. In this case, an angle ψ formed by a tangential line v at a point P on the machining line C (r=p(θ)) and a normal line u passing through the point P with respect to a vector $O_pP$ from the polar coordinate origin $O_p$ to the point P can be calculated by Mathematical formula 1 in the manner described above. Thus, the cutting point fixation command generator 120 can compute a position command at the time of performing cutting at the point P by following Mathematical formula 6.

$$(c,x,y)=(\psi-\theta+c_0, r \cos \psi+R \cos(\psi-\theta+c_0), r \sin \psi+R \sin(\psi-\theta+c_0))$$ [Mathematical formula 6]

When such machining is performed, the distance R and the angle $c_0$ may be set in advance as shift amounts from the rotation center of the C-axis, in addition to the machining line information.

The control device 1 including the above configuration is capable of easily commanding control to fix an angle at which a tool contacts a workpiece during the machining of a machining line with one rotational axis and two linear axes. Even if the polar coordinate origin of a machining line to be machined is deviated from the rotation center of the C-axis, that is, even where an eccentric machining line is machined, it is possible to easily give a command. Application to the lift data of a cam shape can also be easily performed. In addition, it is possible to easily perform various corrections such as tool diameter correction.

Figure 5:
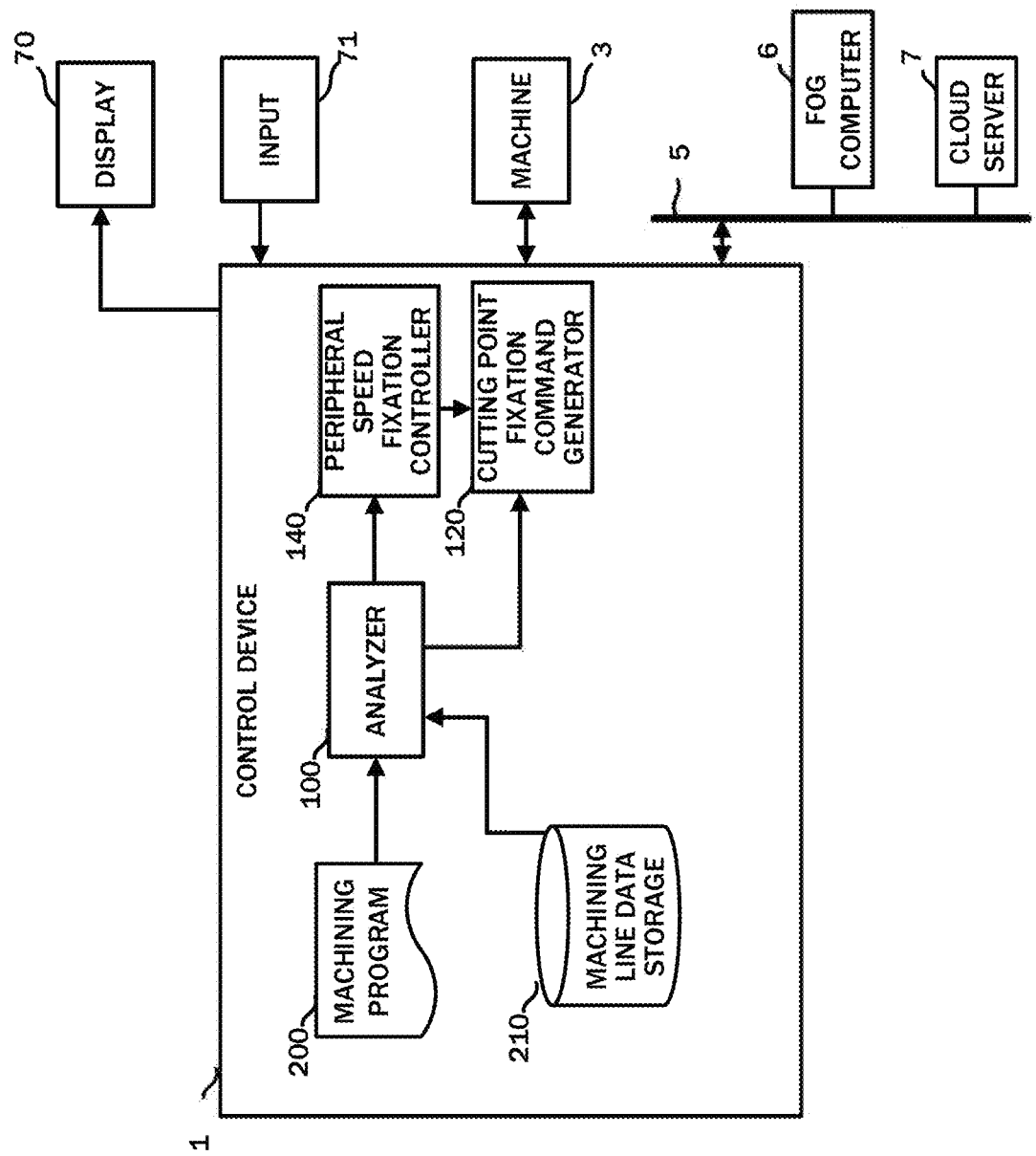
FIG. 5 is a schematic block diagram showing the functions of a control device according to a second embodiment.
Figure 6A:
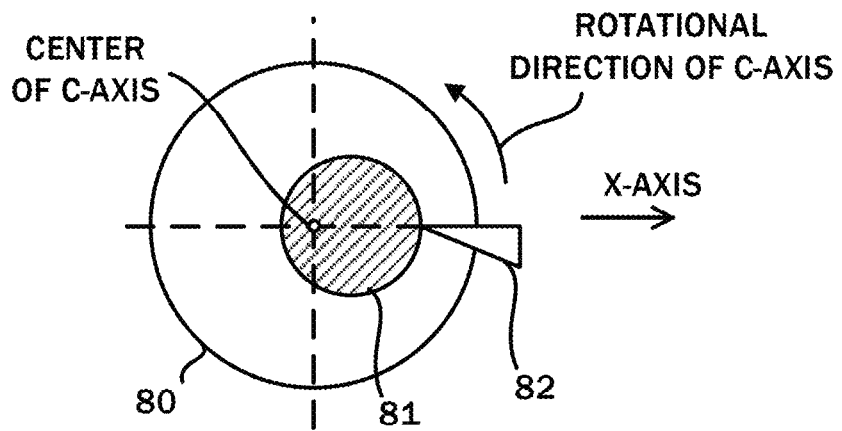
FIG. 6A is a diagram for illustrating a problem residing in a conventional machining method.
Figure 6B:
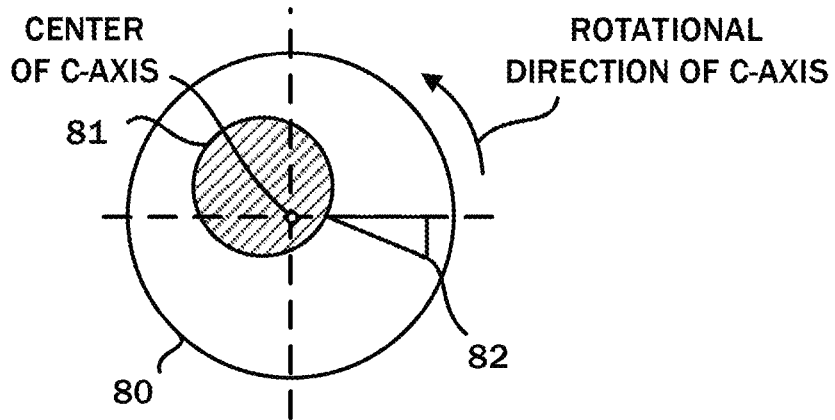
FIG. 6B is a diagram for illustrating the problem residing in the conventional machining method.
Figure 6C:
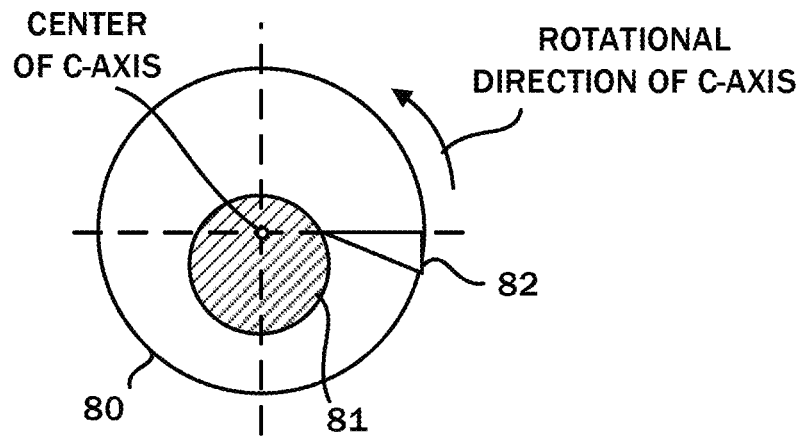
FIG. 6C is a diagram for illustrating the problem residing in the conventional machining method.
Figure 7:
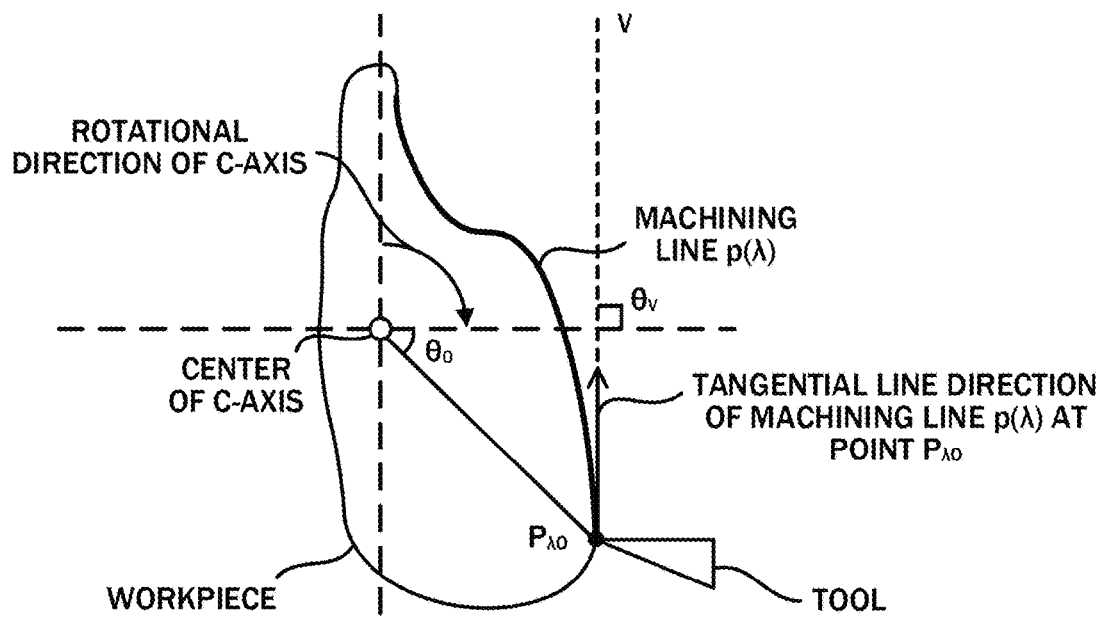
FIG. 7 is a diagram for illustrating cutting point fixation control according to the present invention.
Figure 8:
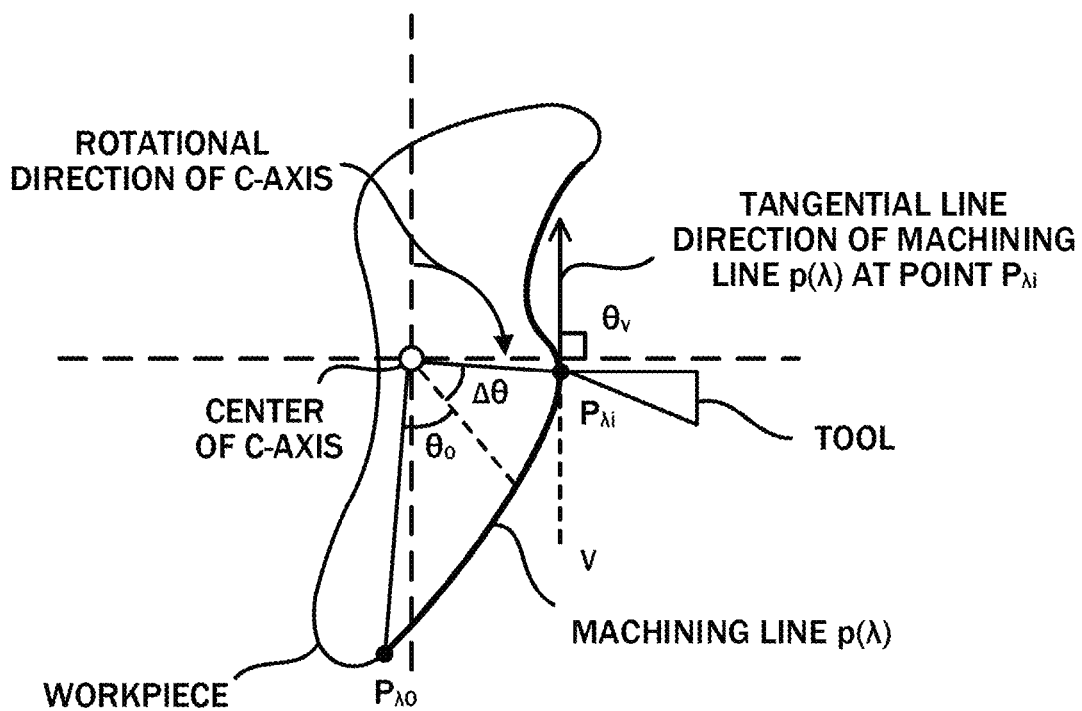
FIG. 8 is another diagram for illustrating the cutting point fixation control according to the present invention.
Figure 9:
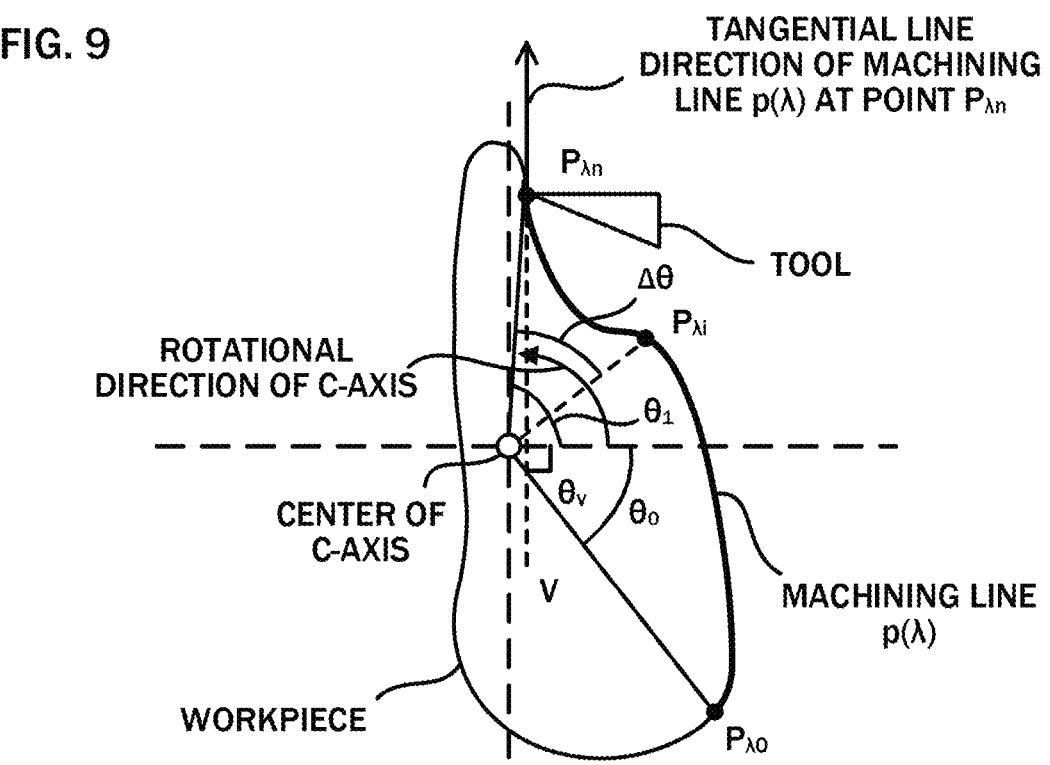
FIG. 9 is another diagram for illustrating the cutting point fixation control according to the present invention.

FIG. 5 shows a schematic block diagram of functions provided in the control device 1 according to a second embodiment of the present invention. The respective functions included in the control device 1 according to the present embodiment are actualized when the CPU 11 included in the control device 1 shown in FIG. 1 performs a system program and controls operations of the respective units in the control device 1.

The control device 1 of the present embodiment includes a peripheral speed fixation controller 140, in addition to an analyzer 100 and a cutting point fixation command generator 120. Furthermore, in the RAM 13 and the non-volatile memory 14 in the control device 1, a machining line data storage 210 for storing a machining program 200 used to control the machine 3 and serving as a region to store machining line information displayed by one parameter and the tangential line information of the machining line in a plane is provided.

In receiving a "cutting point fixation control start command" from the machining program 200, the analyzer 100 according to the present embodiment reads machining line information and the tangential line information of the machining line from the machining line data storage 210 and gives a command to start cutting point fixation control based on the read machining line information and tangential line information to the cutting point fixation command generator 120 and the peripheral speed fixation controller 140.

The peripheral speed fixation controller 140 is actualized when the CPU 11 included in the control device 1 shown in FIG. 1 runs the system program read from the ROM 12 and mainly performs computation processing using the RAM 13 and the non-volatile memory 14 by the CPU 11. The peripheral speed fixation controller 140 calculates, on the basis of machining line information and tangential line information that is input from the analyzer 100, a change amount Δθ of a machining position for each command cycle so that the relative speed between the workpiece of the machining line shown by the machining line information and a tool is fixed. The peripheral speed fixation controller 140 calculates the change amount Δθ satisfying following Mathematical formula 7 using, for example, a machining distance Δd for each command cycle set in advance.

$$\Delta d = \|P(\theta-\Delta\theta)-P(\theta)\|$$ [Mathematical formula 7]

The peripheral speed fixation controller 140 may also calculate the change amount Δθ using following Mathematical formula 8 or 9.

$$\Delta d = \int_\theta^{\theta+\Delta\theta} \sqrt{r^2+\dot{r}^2} d\theta$$ [Mathematical formula 8]

$$\Delta d = \sqrt{r^2+\dot{r}^2} \Delta\theta$$ [Mathematical formula 9]

The calculation of the change amount Δθ using any of the mathematical formulas may be appropriately determined according to a calculation time and accuracy. The peripheral speed fixation controller 140 outputs the change amount Δθ thus calculated to the cutting point fixation command generator 120.

When the cutting point fixation command control is started, the cutting point fixation command generator 120 computes the position of respective axes in a case in which the parameter θ of the machining line information is changed by a change amount Δθ of the machining position for each command cycle from an angle $\theta_0$ showing the start position of the machining line to an angle $\theta_1$ showing the end position of the machining line, the change amount Δθ calculated by the peripheral speed fixation controller 140, and then commands the position to the respective axes. As for the other functions, the cutting point fixation command generator 120 includes the functions similar to those of the cutting point fixation command generator 120 according to the first embodiment.

As with the first embodiment, the control device 1 including the above configuration is capable of easily commanding control to fix an angle at which the tool contacts the workpiece during the machining of a machining line with one rotational axis and two linear axes. Furthermore, because the relative speed between the workpiece and the tool can be fixed, quality can be improved with the finish of a machined surface uniformly maintained.

The embodiment of the present invention is described above. However, the present invention is not limited to the examples of the above embodiment but can be performed in various modes with the addition of appropriate modifications.

The above embodiment particularly describes the operation of a case in which machining is expressed by polar coordinates, but the present invention is similarly applicable also to a machining line on a plane described in a different coordinate system through coordinate conversion. For example, following Mathematical formula 10 is illustrated as a coordinate conversion formula familiar when it is applied to a machining line $p(\lambda)=(p_x(\lambda),p_y(\lambda))$ expressed by orthogonal coordinates. In Mathematical formula 10, $p_x$ and $p_y$ with a prime are those obtained by differentiating $p_x$ and $p_y$, respectively.

$$r = \sqrt{p_x^2 + p_y^2}$$
$$\theta = \arctan\frac{p_y}{p_x}$$
$$\frac{\dot{r}}{r} = \frac{p_x p'_x + p_y p'_y}{p_y p'_x - p_x p'_y}$$

[Mathematical formula 10]

By the application of Mathematical formula 10 to Mathematical formula 1, 5 or 6, the method of the present invention can be applied also to the machining line $p(\lambda)$ expressed by orthogonal coordinates. The method of the present invention is applicable also to machining lines expressed by other coordinate systems by the use of the coordinate conversion formulas between respective coordinate systems and polar coordinate systems.

REFERENCE SIGNS LIST

1 Control device
3 Machine
5 Network
6 Fog computer
7 Cloud server
11 CPU
12 ROM
13 RAM
14 Non-volatile memory
15, 17, 18, 20 Interface
16 PLC
19 I/O unit
22 Bus
30 Axis control circuit
40 Servo amplifier
50 Servo motor
70 Display
71 Input
72 External equipment
100 Analyzer
120 Cutting point fixation command generator
140 Peripheral speed fixation controller
200 Machining program
210 Machining line data storage

The invention claimed is:

1. A control device for controlling a machine including at least one rotational axis and two linear axes configured to relatively move a tool and a workpiece on a basis of a machining program to perform machining on the workpiece, the control device comprising:
a machining line data storage configured to store machining line information expressing a machining shape on a plane of the workpiece as the machining line with a function displayed by a prescribed parameter and tangential line information showing a tangential line direction at respective positions of the machining line; and
a processor configured to generate, for each command cycle of the machining on a basis of the machining line information and the tangential line information, position commands of the rotational axis and the two linear axes with a position on the machining line obtained when the parameter is changed by a prescribed amount from a start machining position in which the parameter of the machining line is changed to an end position of the machining line, wherein
the position commands generated by the processor include both a command for a position of the rotational axis at which a tangential line at the machining position forms a prescribed angle with respect to any one of the two linear axes and a command of positions of the two linear axes at which an angle of a contact point of the tool to the workpiece during the machining of the machining shape for the workpiece is set to the machining position when the rotational axis is located at the position of the rotational axis at which the tangential line forms the prescribed angle,
wherein the prescribed angle for the position of the rotation axis and the positions of the two linear axes are expressed by:
$(c, x, y)=(\psi-\Theta, r\cos\psi, r\sin\psi)$, where c is a position command of the C-axis and x and y are the position commands of X and Y axes for the two linear axes, respectively.

2. The control device according to claim 1, wherein the processor is further configured to control a change amount of the prescribed angle of the machining position for the tool so that a relative speed between the workpiece and the tool is fixed.

3. The control device according to claim 1, wherein the prescribed parameter is a rotational angle $\Theta$ in a polar coordinate system.

* * * * *